United States Patent [19]

Yamane et al.

[11] Patent Number: 5,566,262
[45] Date of Patent: Oct. 15, 1996

[54] OPTICAL FIBER ARRAY AND A METHOD OF PRODUCING THE SAME

[75] Inventors: Motohiro Yamane; Yoshiharu Taga; Shizuka Yamaguchi, all of Tokyo, Japan

[73] Assignee: The Furukawa Electric Co., Ltd., Tokyo, Japan

[21] Appl. No.: 236,360

[22] Filed: Apr. 29, 1994

[30] Foreign Application Priority Data

May 14, 1993 [JP] Japan ................................. 5-112912
May 14, 1993 [JP] Japan ................................. 5-112913

[51] Int. Cl.$^6$ ................................................ G02B 6/36
[52] U.S. Cl. ........................... 385/33; 385/74; 385/77; 385/93; 385/94
[58] Field of Search ........................... 385/33, 77, 80, 385/83, 84, 85, 89, 86, 59, 71, 139, 63, 74, 93, 94

[56] References Cited

U.S. PATENT DOCUMENTS

| 4,221,461 | 9/1980 | Bair ................................ 385/77 |
| 4,265,699 | 5/1981 | Ladany .......................... 385/35 X |
| 4,290,667 | 9/1981 | Chown ......................... 385/139 X |
| 4,812,002 | 3/1989 | Kato et al. ...................... 385/33 |

FOREIGN PATENT DOCUMENTS

| 0226274A3 | 6/1987 | European Pat. Off. . |
| 0444810A1 | 9/1991 | European Pat. Off. . |
| 2516662 | 4/1975 | Germany . |
| 3-6612 | 1/1991 | Japan . |

OTHER PUBLICATIONS

Patent Abstracts of Japan, vol. 7, No. 274 (P–241) Dec. 7, 1983 & JP–A–58 152 213 (Fujitsu) Sep. 9, 1983.
Applied Optics, vol. 30, No. 15, May 20, 1991, New York USA pp. 1958–1962, C. W. Barnard et al, "Single–Mode Fiber Microlens with Controllable Spot Size" Chapter III.
Patent Abstracts of Japan, vol. 6, No. 53 (P–109) Apr. 8, 1982 & JP–A–56 167 115 (Fujitsu), Dec. 22, 1981.
Patent Abstracts of Japan, vol. 8, No. 82 (P–268), Apr. 14, 1984 & JP–A–59 000 105 (Mitsubishi) Jan. 5, 1984.

*Primary Examiner*—Rodney B. Bovernick
*Assistant Examiner*—Hemang Sanghavi
*Attorney, Agent, or Firm*—Frishauf, Holtz, Goodman, Langer & Chick

[57] ABSTRACT

An optical fiber array includes a plurality of optical fibers which are arranged and fixed in a fiber array member. The optical fibers each have an end projecting from an end face of the fiber array member at substantially the same distance, and each have a lens formed at the end thereof. The optical fiber array is produced by arranging and fixing a plurality of optical fibers in the fiber array member such that each end of the optical fibers is projected from the end face of the fiber array member; forming a coating layer of a desired thickness over the end face of the fiber array member and portions of the optical fibers projecting from the end face of the fiber array member; collectively polishing the ends of the optical fibers projecting from the end face of the fiber array member, together with the coating layer, up to a predetermined position, thereby making the lengths of projections of the optical fibers substantially equal; and removing the coating layer and forming a lens at each end of the optical fibers.

14 Claims, 9 Drawing Sheets

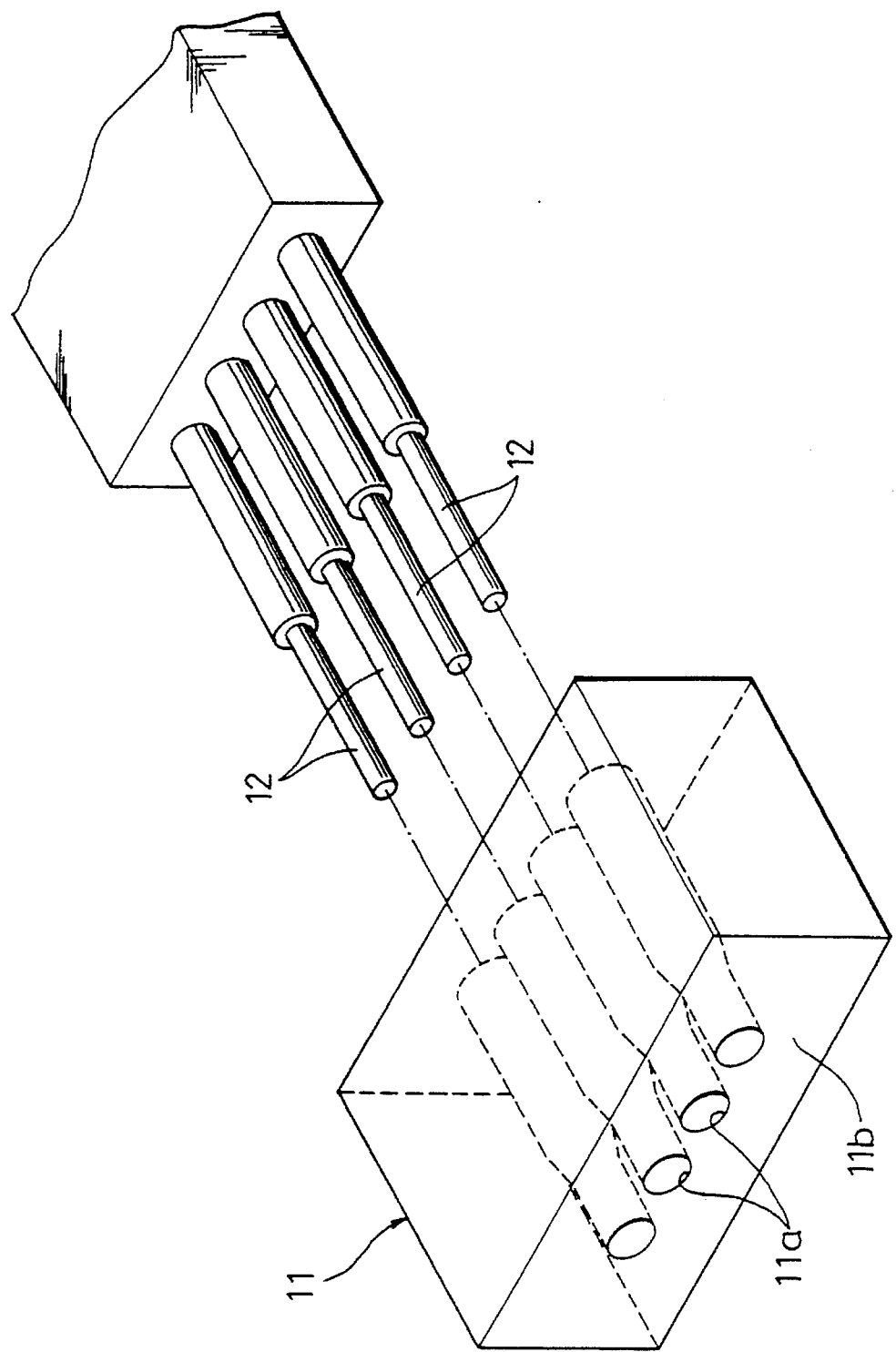

OPTICAL FIBER ARRAY AND A METHOD OF PRODUCING THE SAME

BACKGROUND OF THE INVENTION

1. Field of the Invention

The present invention relates to an optical fiber array coupled to a semiconductor laser diode array and a method of producing the optical fiber array, and more particularly, to an optical fiber array in which a plurality of optical fibers, each having a lens formed integrally at an end thereof, are arrayed in such a manner that they project from an end face of a fiber array block by substantially the same length, and a method of producing the optical fiber array.

2. Description of the Related Art

A conventional light-emitting module incorporated in an optical communications system comprises a laser diode (hereinafter referred to as "LD") serving as a light source, and a lens interposed between the LD and an optical fiber for converging the laser beam onto the core of the optical fiber. To make good use of the energy of the LD, the module is required to have a high coupling efficiency which is the ratio (%) of the amount of light incident on the optical fiber to the amount of light emitted from the LD. To this end, the light-emitting module is assembled with the optical axes of the LD, lens, and optical fiber aligned with each other, so as to achieve a maximum coupling efficiency between the LD and the optical fiber.

Recently, an optical fiber has been proposed in which a lens is formed directly on an end thereof (hereinafter referred to as "lensed optical fiber"). In this type of optical fiber, the fiber end itself functions as a lens. Consequently, the number of parts constituting the module is lessened. Also, the number of operations required for the optical axis alignment during manufacture can be reduced, whereby the cost is cut down.

The lensed optical fiber is produced in the manner described below, for example.

First, an optical fiber, from which a jacket has been removed, is heated locally by heating means such as a burner, with a tensile force applied thereto, whereby the heated portion is extended. When the outer diameter of the heated portion is decreased to about 10 μm or less, application of the tensile force is stopped. After the diameter-reduced part is cut with a cutter, the cut end of the optical fiber is again heated by the burner for fusion. As the fiber end is melted, its shape becomes semispherical due to surface tension, and this semispherical end functions as a lens.

Thus, the lensed optical fiber has a semispherical lens at an end thereof, as well as a taper portion of a certain length whose diameter gradually increases with distance from the semispherical end.

A conventional light-emitting module using the lensed optical fiber has an arrangement shown in FIG. 16, for example, as disclosed in Unexamined Japanese Utility Model Publication (KOKAI) No. 3-6612. As illustrated, a bare LD 1 is arranged within a package 2 having an upper open end, and a lensed optical fiber 3 is inserted through a wall of the package 2 in such a manner that a lens 3a at the fiber end faces the light-emitting surface of the LD 1 with a space of about 10 μm therebetween. To protect the LD 1 against oxidation and moisture, a cover 4 is fitted on the open end of the package 2, and the lensed optical fiber 3 is firmly secured to the wall by solder 5, so that the package 2 has an airtight structure.

Recently, there is an increasing demand for a light-emitting module capable of connecting an LD array, which includes a plurality of LDs (light sources), to an optical fiber array, which includes a plurality of optical fibers arranged in a fiber array block, by means of a lens array including a plurality of lenses, thereby collectively coupling the LDs to the respective optical fibers.

In such a light-emitting module, the coupling efficiency between the individual arrays is preferably as high as possible. Also, the emission power of the individual optical fibers arranged in the fiber array needs to be identical.

Thus, when producing a light-emitting module, it is necessary that the dimensional accuracy of each array be high and that the optical axes of the LDs, lenses, and optical fibers be aligned for each optical path.

In the case where this type of light-emitting module is produced using the lensed optical fibers, preliminary work is required wherein a plurality of lensed optical fibers are arrayed and fixed to a fiber array block to obtain an optical fiber array.

In this case, if the ends of the lensed optical fibers are positioned irregularly with respect to the corresponding LDs of the LD array, there occurs a variation in the distances from the LDs to the corresponding fiber ends when the LD array is coupled to the optical fiber array. Consequently, a plurality of optical systems each comprising an optical fiber and an LD associated therewith will have different coupling efficiencies, lowering the reliability of the light-emitting module.

Further, since the lensed optical fiber has a semispherical lens at an end thereof, positioning the lens surfaces of all fibers in alignment requires significant labor, unlike the conventional optical fibers whose end faces are perpendicular to their optical axes.

Generally, the fiber array block is made of a synthetic resin such as epoxy resin, and when a light-emitting module is assembled, the LD array and the optical fiber array are placed close to each other. Accordingly, during operation of the light-emitting module, gas is emitted from the synthetic resin forming the optical fiber array, due to heat generated by the LD array, and contaminates the LD array.

SUMMARY OF THE INVENTION

The present invention was created to solve the above problem associated with the manufacture of an optical fiber array, or more specifically, the positioning of lensed optical fibers with respect to a fiber array block, and a first object of the invention is to provide an optical fiber array and a method of producing the same, by which the lens surfaces of all optical fibers can be easily positioned in alignment, variation in coupling efficiency between the fiber array and an LD array is eliminated, and high coupling efficiency is achieved.

A second object of the present invention is to provide an optical fiber array and a method of producing the same, wherein the LD array coupled to the optical fiber array is prevented from being contaminated during operation thereof.

To achieve the first object, the present invention provides an optical fiber array comprising a plurality of optical fibers, and a fiber array member in which the optical fibers are arranged and fixed, wherein the optical fibers each have an end projecting from an end face of the fiber array member by a substantially equal length, and each have a lens formed at the end thereof.

The optical fiber array is produced by a method comprising the following steps:

A step of arranging and fixing a plurality of optical fibers in a fiber array member such that an end of each of the optical fibers is projected from an end face of the fiber array member; a step of forming a coating layer of a desired thickness over the end face of the fiber array member and portions of the optical fibers projecting from the end face of the fiber array member; a step of collectively polishing the ends of the optical fibers projecting from the end face of the fiber array member, together with the coating layer, up to a predetermined position, thereby making the lengths of projections of the optical fibers substantially equal; and a step of removing the coating layer and forming a lens at the end of each of the optical fibers.

In the optical fiber array and the method of producing the same according to the present invention, the ends of the optical fibers projecting from the end face of the fiber array member are collectively polished. Accordingly, even if the optical fibers are irregularly projected, the lengths of the projections of the optical fibers can be made substantially equal by the polishing step.

During the polishing step, the coating layer covering the ends of the optical fibers serves to reinforce the fibers. Thus, even if the projections of the optical fibers from the fiber array member are somewhat too long, the polishing step can be smoothly carried out.

After the optical fibers are collectively polished, the coating layer having a certain thickness and covering the end face of the fiber array member is removed, whereby the ends of the optical fibers are projected from the end face of the fiber array member by an equal length.

Finally, lenses are collectively formed at the respective ends of the optical fibers. Accordingly, the distances from the lenses of the individual optical fibers to the end face of the fiber array member are equal to each other, whereby variation in the coupling efficiency of the optical fibers can be eliminated.

Preferably, the optical fibers each comprise a silica glass optical fiber.

Still more preferably, each silica glass optical fiber is an optical fiber such that when it is immersed in hydrofluoric acid or a solution of a mixture of hydrofluoric acid and ammonium fluoride, the cladding thereof is etched faster than the core thereof.

Such a silica glass optical fiber includes an optical fiber having a core made of pure silica glass and a cladding made of silica glass doped with a fluorine-based substance, and an optical fiber having a core made of silica glass doped with germanium dioxide and a cladding made of pure silica glass or silica glass doped with a fluorine-based substance.

Preferably, the fiber array member is made of a synthetic resin, and has a plurality of fiber holes formed therethrough at an equal pitch such that the optical fibers are respectively inserted into the fiber holes.

Still more preferably, a shield layer, for example, a metal plating layer, is formed on an outer periphery of the fiber array member and outer peripheries of the optical fibers. With this arrangement, not only the first object but the second object of the present invention is achieved. Namely, an optical fiber array is provided wherein an LD array connected thereto is prevented from being contaminated during operation.

This optical fiber array is produced by forming the shield layer over the entire surface of the fiber array member and the entire surfaces of the portions of the optical fibers projecting from the fiber array member before the coating layer is formed.

Preferably, the lens formation step includes an etching step in which the ends of the optical fibers are immersed in hydrofluoric acid or a solution of a mixture of hydrofluoric acid and ammonium fluoride so that the cladding of each optical fiber is etched faster than the core thereof.

In the optical fiber array and the method of producing the same according to the present invention, even if the optical fibers project irregularly from the end face of the fiber array member, the lengths of the projections of the fibers can be finally made equal, and lenses are formed at the respective ends of the fibers at an equal distance from the end face of the fiber array member. Thus, it is possible to do away with the labor-consuming step of aligning each end of the optical fibers with respect to the fiber array member, which work is associated with the conventional optical fiber array.

The optical fiber array thus produced exhibits high coupling efficiency when connected to an LD array, and there is no variation of coupling efficiency between the LDs and the corresponding optical fibers because the lengths of the projections of the fibers are the same. Accordingly, a high-reliability light-emitting module can be provided.

Further, by covering the surface of the fiber array member with the shield layer, it is possible to prevent contamination of the LD array which can be caused by the gas produced from the fiber array member.

The above and other objects, features, and advantages of the present invention will become apparent from the following description when taken in conjunction with the accompanying drawings.

BRIEF DESCRIPTION OF THE DRAWINGS

FIG. 2 is a perspective view illustrating how a plurality of optical fibers are arranged in a fiber array block according to an optical fiber array producing method of the present invention;

DETAILED DESCRIPTION OF THE PREFERRED EMBODIMENTS

An optical fiber array and a method of producing the same, according to a first embodiment of the present invention, will be described in detail with reference to FIGS. 1 to 8.

Figure 1:
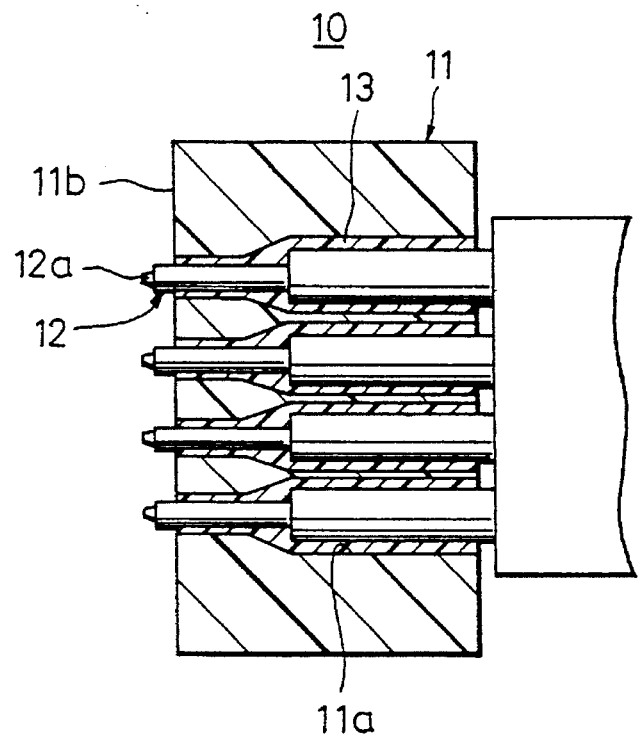
FIG. 1 is a sectional plan view of an optical fiber array according to a first embodiment of the present invention.

As shown in FIG. 1, an optical fiber array 10 comprises a fiber array block 11, and a plurality of (in the figure, four) optical fibers 12 secured to the block 11 by adhesive 13.

The fiber array block 11 is a rectangular parallelepiped member made of a synthetic resin, and has four fiber insertion holes 11a formed through a central portion thereof at regular intervals (at an equal pitch).

The optical fibers 12 are obtained, for example, by removing a covering from a tape fiber. In the illustrated fibers 12, a jacket has further been removed to expose a cladding. The optical fibers 12 project from an end face 11b of the fiber array block 11 by substantially the same length, and a lens 12a is formed at each end of the fibers 12.

The optical fiber array 10 having the illustrated construction was produced by a method described below.

First, as shown FIG. 2, the optical fibers 12 were inserted into the respective fiber insertion holes 11a of the fiber array block 11.

The fiber array block 11 is preferably made of a material which is not eroded by an etchant used when forming the lens 12a at each end of the optical fibers 12. For example, the block 11 is made of a resin such as epoxy resin. The resin block was machined to form the fiber insertion holes 11a with high accuracy at a pitch of, for example, 250 μm. The fiber array block 11 can be produced by molding resin in a die, similar to forming a conventional multifiber connector.

Subsequently, the optical fibers 12, which had been inserted through the respective fiber insertion holes 11a, were fixed by epoxy resin adhesive 13, for example (see FIG. 3).

Figure 3:
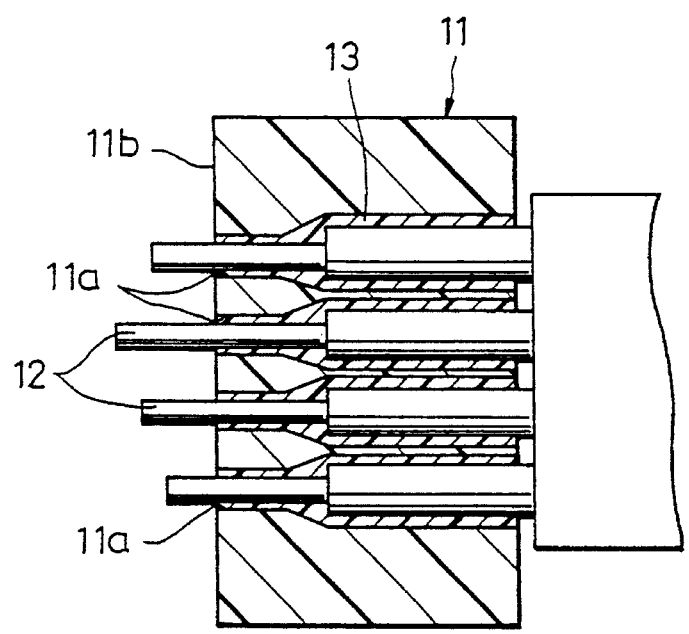
FIG. 3 is a sectional plan view of the fiber array block in which optical fibers are securely arranged.

In this case, the lengths by which the respective optical fibers 12 project from the end face 11b of the fiber array block 11 need not be the same, and may differ as shown in FIG. 3.

The optical fibers used should be those whose cladding and core are made of materials such that the cladding is etched faster than the core when the fiber is immersed in an etchant such as hydrofluoric acid or a solution of a mixture of hydrofluoric acid and ammonium fluoride.

Available optical fibers include the following:

A first optical fiber: A core is made of pure silica glass ($SiO_2$), and a cladding, which surrounds the core, is made of glass prepared by doping silica glass with a fluorine-based substance.

A second optical fiber: The core is made of silica glass doped with germanium dioxide ($GeO_2$). In this case, the cladding may be made of pure silica glass or silica glass doped with a fluorine-based substance.

In the first optical fiber, the amount of the fluorine-based substance doped in the cladding is controlled such that, when the fiber end is immersed in the etchant, a proper difference is produced between the speed of etching the cladding and the speed of etching the core. This etching speed difference should be such that after the etching, the fiber end has a core protruding in the form of a cone (or truncated cone) which can properly function as a lens. Furthermore, the amount of the fluorine-based substance doped in the cladding is adjusted such that the difference in refractive index between the core and the cladding is, normally, about 0.3% to 0.4%, so as not to adversely affect the light transmission property of the optical fiber.

The cladding may be doped with a phosphorus-based substance in place of the fluorine-based substance, or both phosphorus- and fluorine-based substances may be doped in the cladding.

Further, the material of the core may not be pure silica glass. In the case where the core is made of silica glass doped with a fluorine-based substance or a germanium-based substance such as germanium dioxide, for example, the cladding may be doped with a greater amount of a fluorine-based substance to such an extent that the light transmission property is not affected, to thereby give rise to an etching speed difference between the core and the cladding.

The above applies also to the second optical fiber. Namely, the amount of the germanium-based substance doped in the core is controlled such that, when the fiber end is immersed in the etchant, a proper difference is produced between the speed of etching the cladding and the speed of etching the core. Also in this case, the etching speed difference should be such that after the etching, the fiber end has a core protruding in the form of a cone (or truncated cone) which properly serves as a lens.

Figure 4:
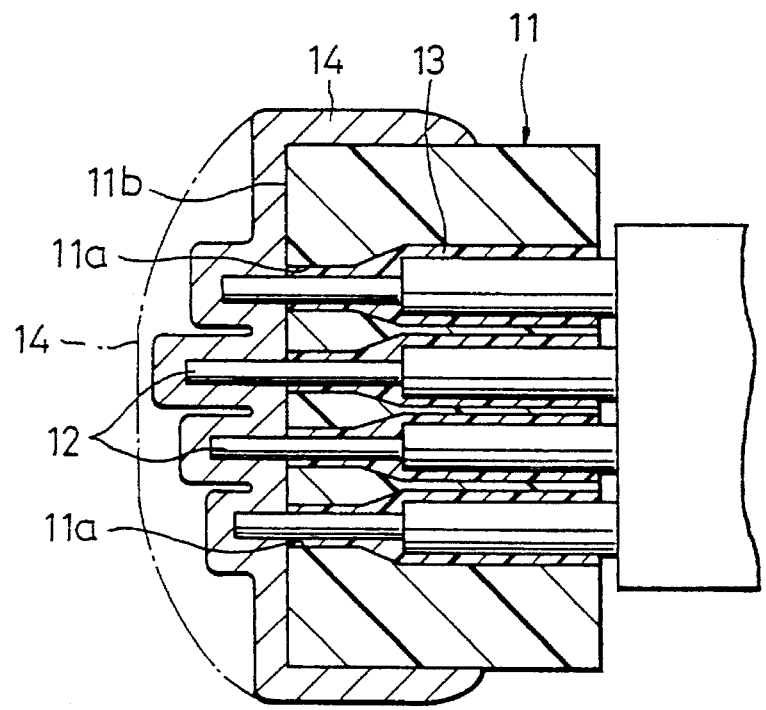
FIG. 4 is a plan view showing a state in which a coating layer is formed on the fiber array block of FIG. 3.

Subsequently, as shown in FIG. 4, a coating layer 14 was formed over the end face 11b of the fiber array block 11 such that the optical fibers 12 projecting from the end face 11b were also covered with the coating layer 14.

The manner of covering the optical fibers 12 with the coating layer 14 is not limited to that illustrated in FIG. 4. For example, the coating layer may be formed over the end face 11b of the fiber array block 11 such that the optical fibers 12 projecting from the end face 11b are completely buried in the coating layer, as indicated by the alternate long and short dash line in FIG. 4.

The coating layer 14 can be formed, for example, by first forming a conductive plating layer on a part of the block 11 where the coating layer is to be formed, by ordinary electroless plating, and then carrying out ordinary electrolytic plating on the plating layer to form a plating layer with a desired thickness. There is no particular restriction on the material of the coating layer 14; for example, the coating layer may be made of a resin such as a photoresist, or of a material which can be separated after polishing, as will be described later.

The thickness of the coating layer 14 is not particularly limited. However, during the formation of lenses, described later, the lengths of the optical fibers 12 projecting from the end face 11b of the fiber array block 11 can be shortened by 20 μm or thereabout. Even in such a case, the lens at each fiber end must be projected from the end face 11b of the fiber array block 11; therefore, the thickness of the coating layer 14 should preferably be about 50 μm.

Figure 5:
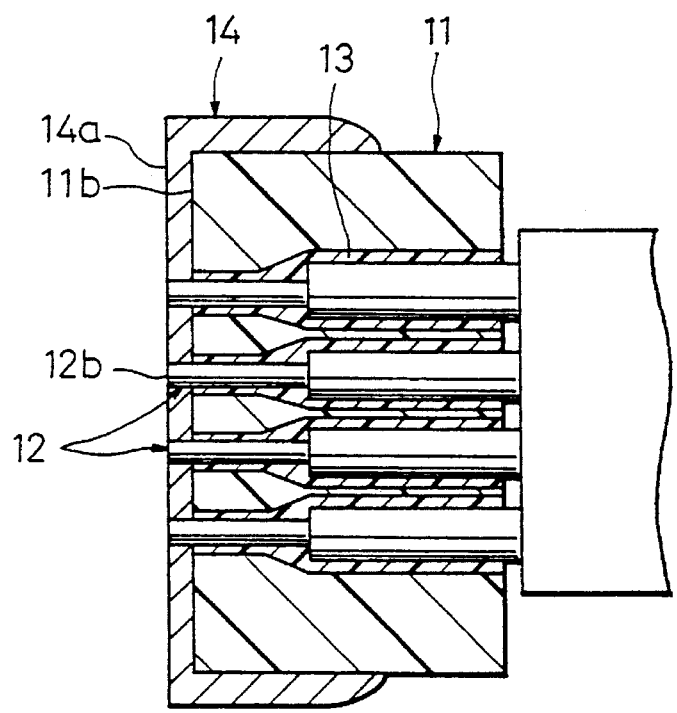
FIG. 5 is a plan view showing a state in which an end face of the fiber array block in FIG. 4 has been polished.

Then, the optical fibers 12 were collectively polished, together with the coating layer 14 formed on the fiber array block 11, up to a predetermined position. Consequently, irregular projections of the optical fibers 12 were removed by the polishing, as shown in FIG. 5, so that polished end faces 12b of the optical fibers 12 are flush with a polished surface 14a of the coating layer 14.

Figure 6:
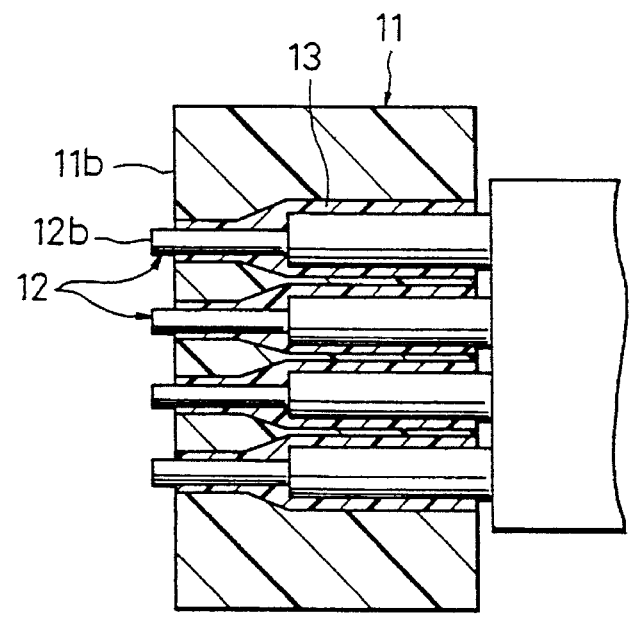
FIG. 6 is a plan view showing a state in which the coating layer has been removed from the fiber array block of FIG. 5.

Subsequently, the coating layer 14 was removed from the fiber array block 11. Accordingly, the ends of the optical fibers 12 were projected from the end face 11b of the fiber array block 11, as shown in FIG. 6. The lengths of the projections of the optical fibers 12 were substantially the same and were equivalent to the thickness of the polished coating layer 14.

A lens 12a was then formed at each end of the optical fibers 12. Specifically, the ends of the optical fibers 12 were immersed in an etchant such as hydrofluoric acid or a solution of a mixture of hydrofluoric acid and ammonium fluoride.

By immersing the ends of the optical fibers 12 in the etchant, the cladding and the core, each made of silica glass, could be etched.

In this case, the cladding was etched faster than the core was, and the optical fiber 12 was etched not only in the axial direction thereof, which made the fiber shorter, but also in the diametrical direction, which made the fiber thinner. The axial etching and the diametrical etching progressed simultaneously. Thus, when a predetermined time had passed, the projection of each optical fiber 12 was shortened, and at the same time the core end was protruded in the form of a core (or truncated cone), which served as a lens 12a, as shown in FIG. 1.

The ends of the optical fibers 12 were etched under the same conditions, and the end face 11b of the fiber array block 11 was not etched at all. Therefore, in the optical fiber array 10 produced in this manner, the projections of all optical fibers 12 from the end face 11b had substantially the same length.

The optical fiber array 10 actually produced in the above-described manner was connected to an LD array in which four LDs had been arranged. Then, the coupling efficiencies between the optical fibers 12 and the respective LDs were measured. The coupling efficiencies proved to be as high as 35% to 40%.

The lens 12a of each optical fiber 12, which is in the form of a truncated cone, may be further irradiated with a concentrated laser beam so as to be heated and melted, in which case the shape of the lens can be changed to semisphere. The optical fibers 12 actually processed in this manner had an even higher coupling efficiency of 65% to 75% between the fibers and the respective LDs.

Figure 7:
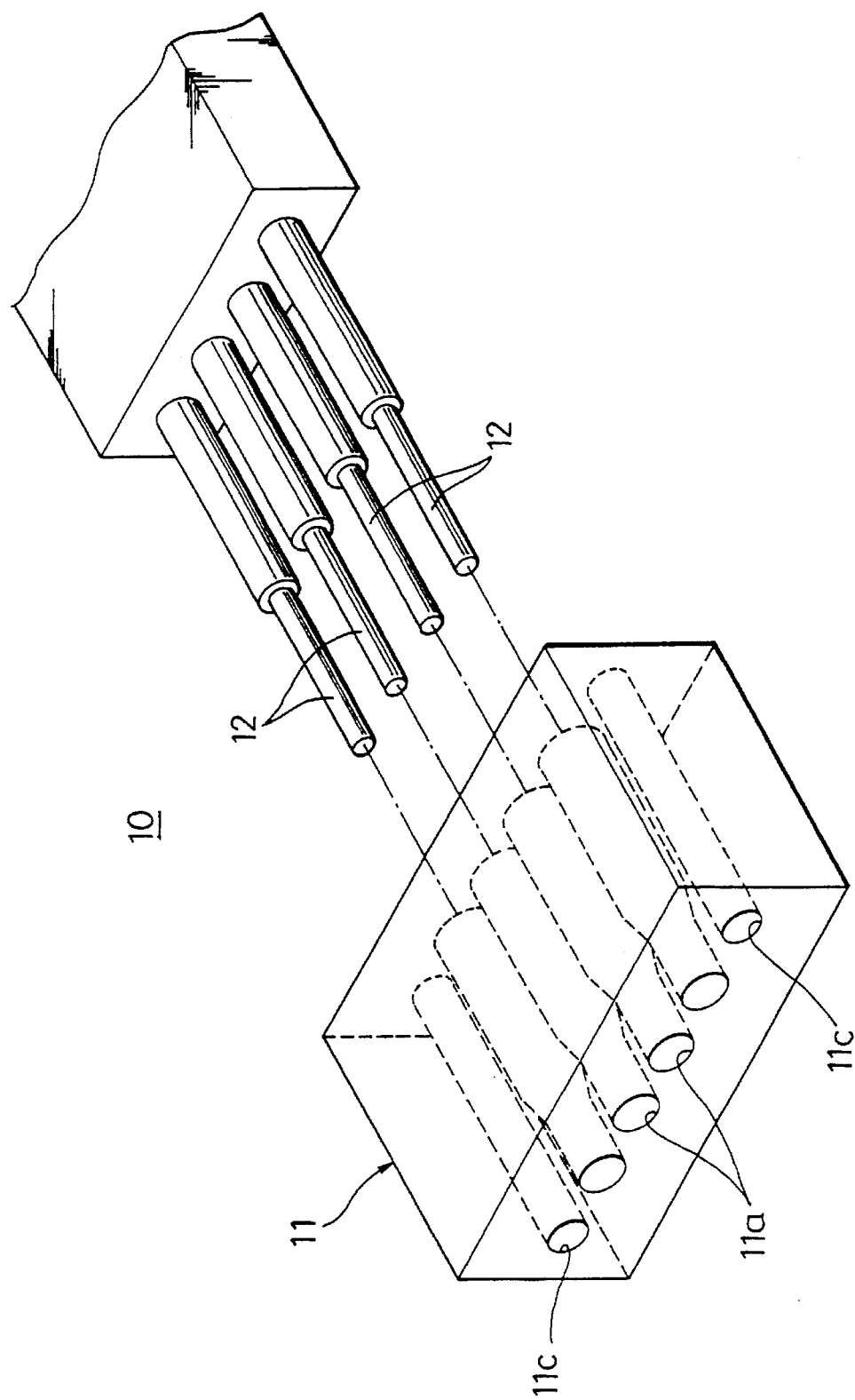
FIG. 7 is a perspective view illustrating how a plurality of optical fibers are arranged in a fiber array block having a different structure.

The optical fiber array 10 of this embodiment can be used with a fiber array block 11 shown in FIG. 7, in which positioning guide holes 11c, 11c are formed on opposite sides of the fiber insertion holes 11a.

Figure 8:
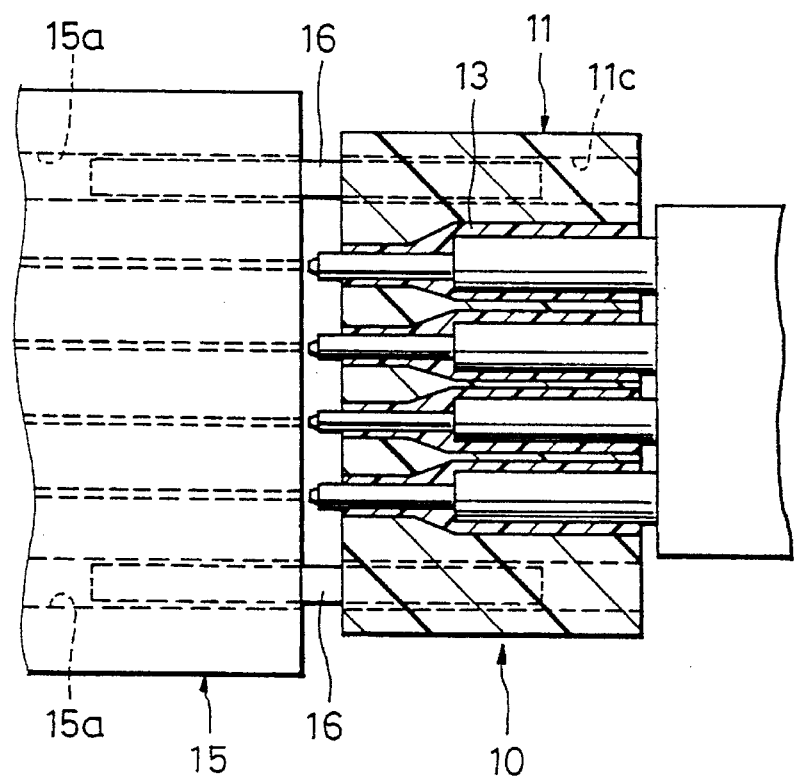
FIG. 8 is a sectional plan view of an optical fiber array which is produced using the fiber array block shown in FIG. 7 and connected to an LD array.

In the case of producing a light-emitting module by using this fiber array block 11, guide holes 15a, 15a are formed also in an LD array 15 to be connected to the optical fiber array 10, at locations corresponding to the respective guide holes 11c, 11c, as shown in FIG. 8. In this case, by inserting guide pins 16, 16 into the corresponding pairs of guide holes 11c and 15a, it is possible to position the optical fiber array 10 relative to the LD array 15 with high accuracy, thus facilitating the connection work.

Further, the end face 11b of the fiber array block 11 may be polished before the optical fiber array 10 is produced by the method of the present invention. In this case, when connecting the optical fiber array 10 produced in this manner to an LD array, the connection work can be facilitated because the polished surface of the fiber array block 11 can be used as a reference mark during the whole connection work.

An optical fiber array and a method of producing the same, according to a second embodiment of the present invention, will now be described in detail with reference to FIGS. 9 to 15.

Figure 9:
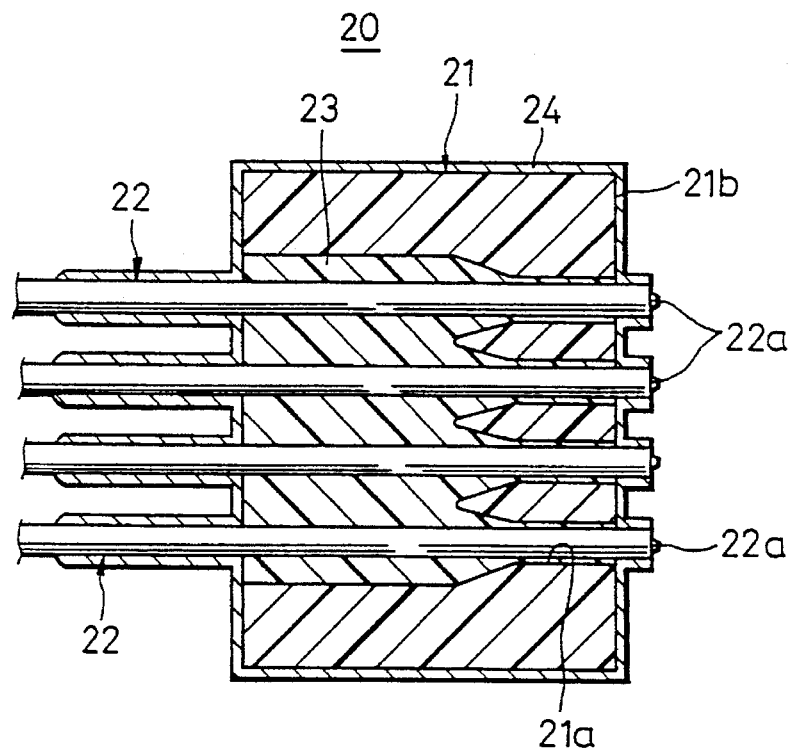
FIG. 9 is a sectional plan view of an optical fiber array according to a second embodiment of the present invention.

In an optical fiber array 20 of this embodiment, as shown in FIG. 9, a plurality of (in the figure, four) optical fibers 22 are fixed in a fiber array block 21 by adhesive 23, and a metal plating layer 24 is formed over the entire surface of the block 21, except for the ends of the optical fibers 22.

The fiber array block 21 is a rectangular parallelepiped member made of a synthetic resin, and has four fiber insertion holes 21a formed through a central portion thereof at regular intervals (at an equal pitch).

The four optical fibers 22 project from an end face 21b of the fiber array block 21 by substantially the same length, and a lens 22a is formed at each end of the fibers 22. The optical fibers 22 are identical with those used in the first embodiment.

The metal plating layer 24 serves to shield the fiber array block 21, and when the block 21 is combined with an LD array to form a light-emitting module, the plating layer 24 functions as a barrier for blocking the gas which is emitted from the synthetic resin forming the optical fiber array 20 due to heat generated by the LD array.

The optical fiber array 20 having the above-described construction was produced by a method described below.

Various steps were carried out under the same conditions as those used in the first embodiment, except for the step of forming the metal plating layer 24, and the materials of the fiber array block 21, optical fibers 22, and etchant for the fibers 22 were identical with the respective materials used in the first embodiment.

Figure 10:
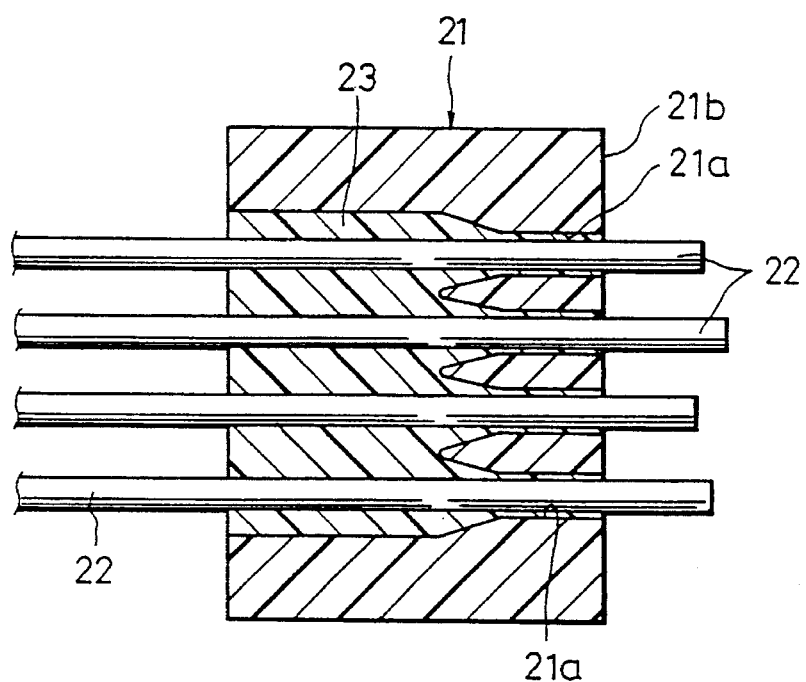
FIG. 10 is a sectional plan view of a fiber array block in which a plurality of optical fibers are securely arranged.

In the first step, as shown in FIG. 10, the optical fibers 22 were inserted into the respective fiber insertion holes 21a of the fiber array block 21 such that the ends thereof were projected from the end face 21b of the block 21, and the fibers 22 were fixed by epoxy resin adhesive 23, for example.

Figure 11:
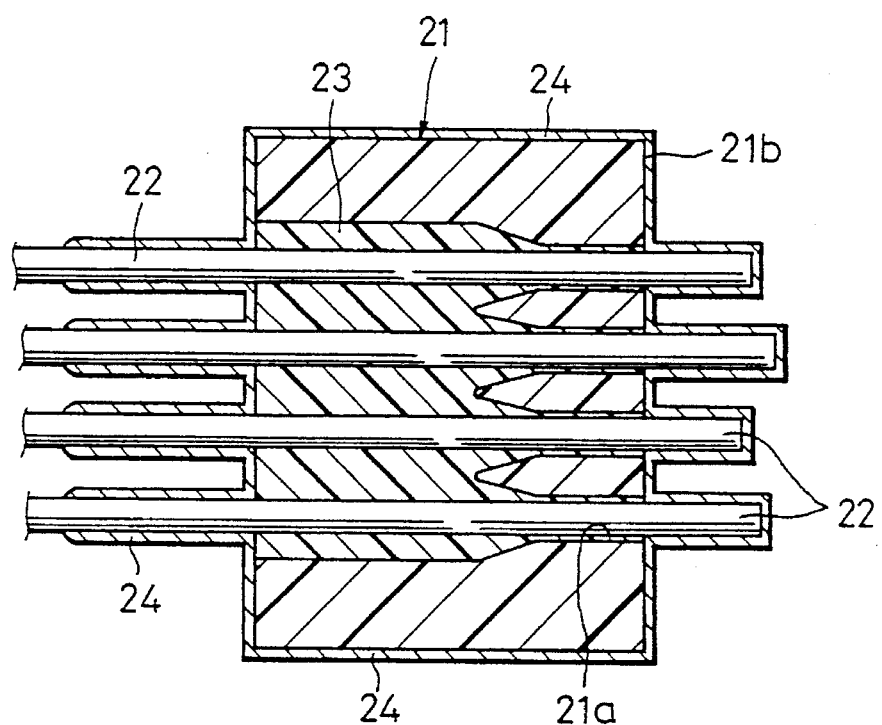
FIG. 11 is a plan view showing a state in which a metal plating layer is formed on the fiber array block of FIG. 10.

Then, in the second step, the metal plating layer 24 was formed over the entire surface of the fiber array block 21 and the surfaces of portions of each optical fiber 22 projecting in opposite directions from the block 21, as shown in FIG. 11.

In this optical fiber array 20 provided with the metal plating layer 24, gas, if produced from the fiber array block 21, is shielded by the metal plating layer 24 and is prevented from being emitted to the outside of the block 21.

The metal plating layer 24 is made of a material which is not eroded by the etchant used when forming lenses in the fourth step, mentioned later, and comprises, for example, a nickel plating layer.

The thickness of the metal plating layer 24 is not particularly limited. However, during the formation of lenses 22a, described later, the lengths of the optical fibers 22 projecting from the end face 21b of the fiber array block 21 can be shortened by about 20 µm. Even in such a case, the lens 22a at each fiber end must be projected from the end face 21b of the fiber array block 21; therefore, the thickness of the metal plating layer 24 should preferably be about 50 µm.

In the third step, the ends of the optical fibers 22 projecting from the end face 21b of the fiber array block 21 were collectively polished.

Figure 12:
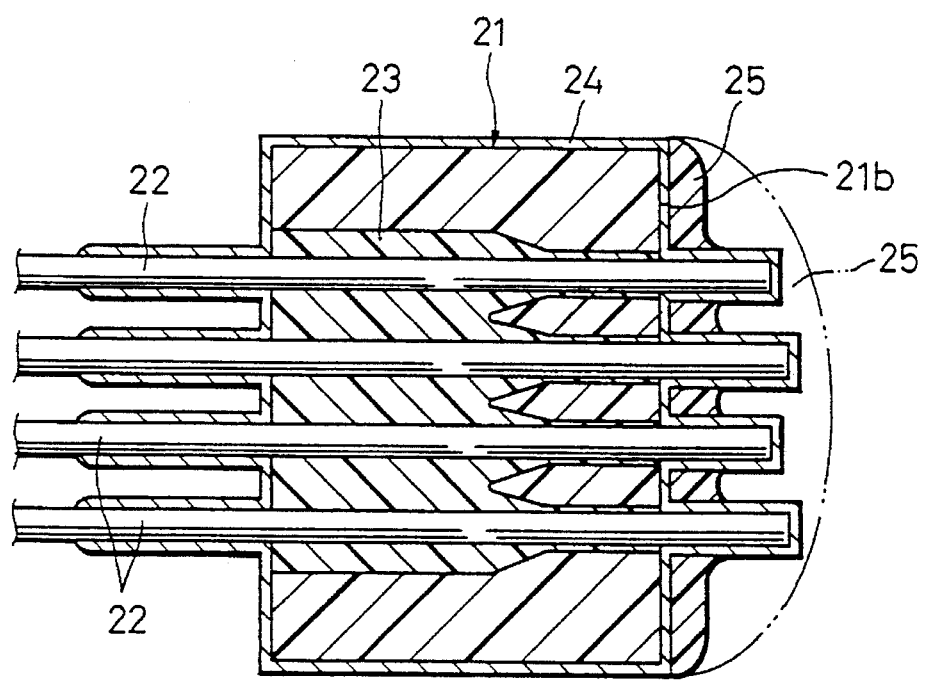
FIG. 12 is a plan view showing a state in which a coating layer is formed on the fiber array block of FIG. 11 to immovably hold the fiber ends.

Preferably, in this case, the ends of the optical fibers 22 projecting from the end face 21b of the block 21 are covered, together with the end face 21b, with a synthetic resin, thereby to form coating layer 25 of cured synthetic resin, as shown in FIG. 12. The coating layer 25 serves to reinforce the optical fibers 22 during the polishing step. The coating layer 25 may be formed in such a manner that the ends of the optical fibers 22 are completely buried in the layer 25, as indicated by the alternate long and short dash line in FIG. 12.

The synthetic resin used includes an ultraviolet-curing resin and a thermosetting resin, for example. After the resin is applied to the end face 21b of the block 21, ultraviolet rays or heat is applied to the resin for curing, whereby the projected end portions of the optical fibers 22 are immovably fixed as they are.

Figure 13:
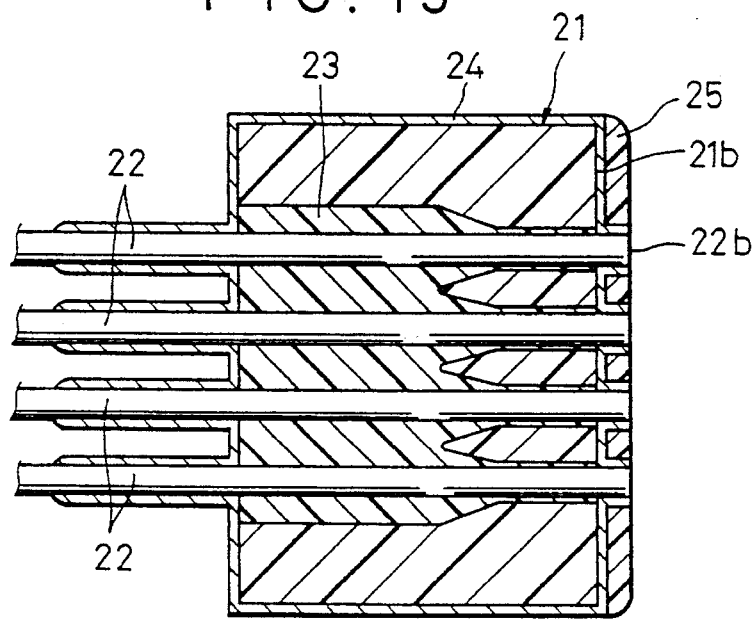
FIG. 13 is a plan view showing a state in which the coating layer formed on the fiber array block of FIG. 12 has been polished, together with the fiber ends.
Figure 14:
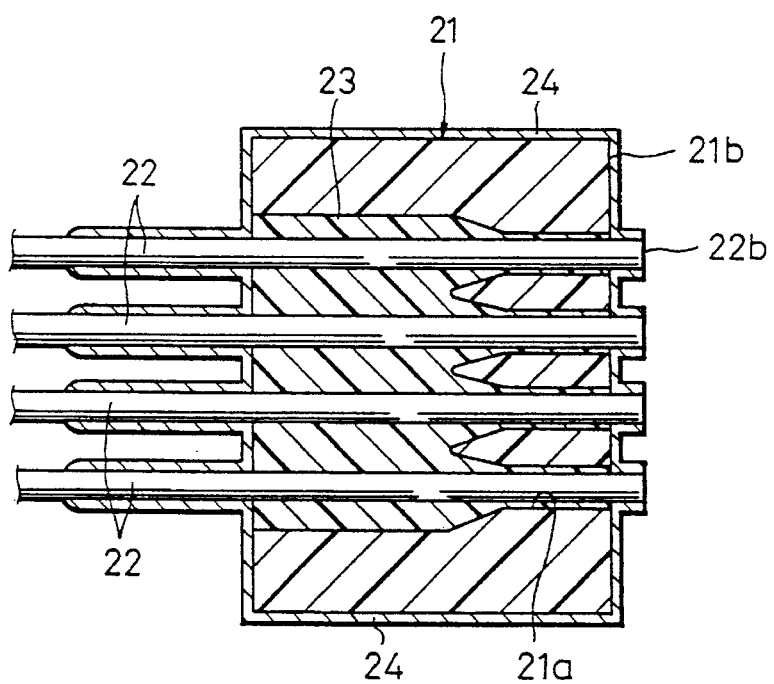
FIG. 14 is a plan view showing a state in which the coating layer has been removed from the fiber array block of FIG. 13.

After the collective polishing, the irregular projections of the optical fibers 22 had been removed by the polishing, as shown in FIG. 13, and the polished end faces 22b of the optical fibers 22 were flush with the polished surfaces of the metal plating layer 24 and coating layer 25. Namely, the polished surfaces 22b of the optical fibers 22 all projected from the end face 21b of the fiber array block 21 by substantially the same length.

Then, the coating layer 25 covering the end face 21b of the fiber array block 21 was removed. As a result, the ends of the optical fibers 22 were projected from the end face 21b of the fiber array block 21, and the polished surfaces 22b thereof were at substantially the same distance from the end face 21b of the block 21 as a reference plane.

Subsequently, in the fourth step, the ends of the optical fibers 22 were immersed in an etchant such as hydrofluoric acid or a solution of a mixture of hydrofluoric acid and ammonium fluoride, to form a lens 22a, which protrudes in the form of a truncated cone, at each end of the optical fibers 22, as shown in FIG. 9.

In the etching step, the end portion of each optical fiber 22 projecting from the end face 21b of the fiber array block 21 is shortened by about 20 to 30 µm. Preferably, therefore, that portion of the metal plating layer 24 which covers the outer periphery of the distal end of each optical fiber 22 is previously removed for a length of approximately 20 to 30 µm prior to the etching step.

The etching was performed on the ends of all optical fibers 22 under the same conditions, and accordingly, the ends of the optical fibers 22 were projected from the end face 21b of the block 21 by substantially the same length.

The truncated cone-shaped lens 22a of each optical fiber 22 may further be irradiated with a concentrated laser beam so as to be heated and melted, in which case the shape of the lens can be changed to semisphere.

Figure 15:
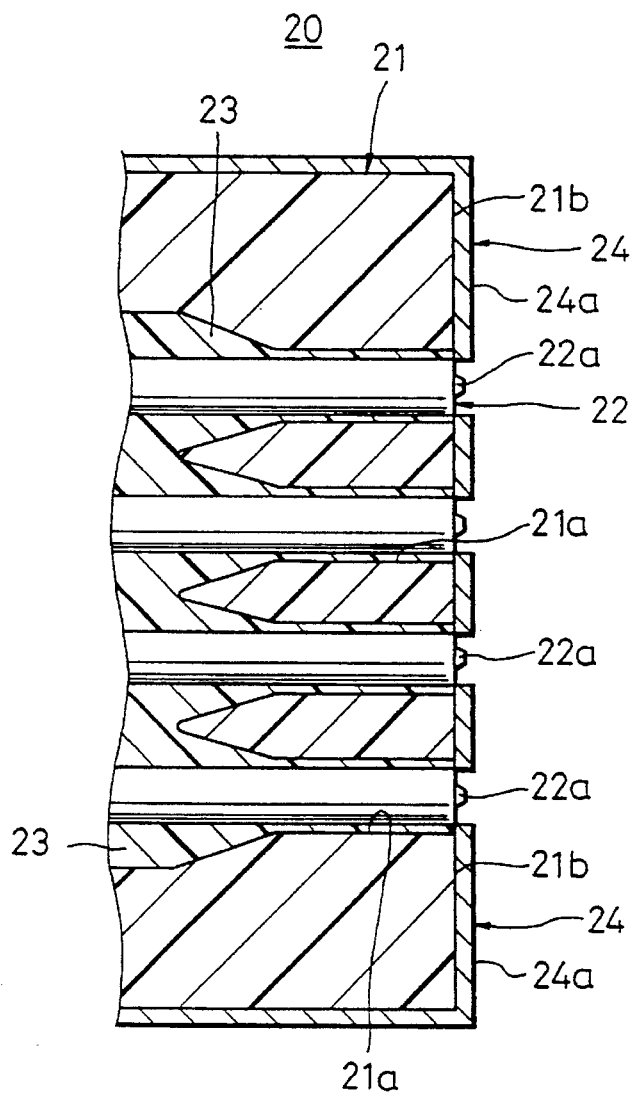
FIG. 15 is a sectional plan view showing a principal part of an optical fiber array which is an example of modification of the second embodiment.
Figure 16:
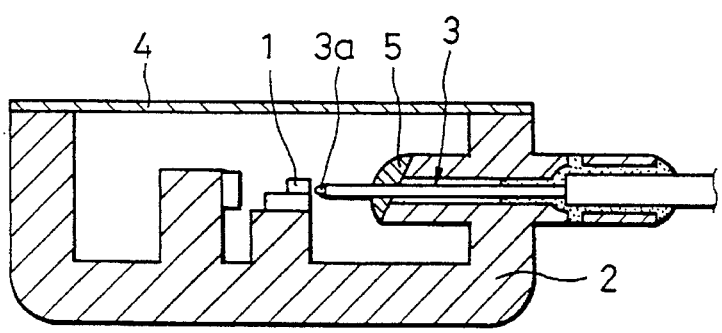
FIG. 16 is a sectional view of a conventional light-emitting module.

In the optical fiber array 20 of this embodiment, the fiber array block 21 having the fiber insertion holes 21a, through which the optical fibers 22 are respectively inserted and fixed by the adhesive 23, can be modified as shown in FIG. 15. Specifically, the lens 22a, formed at each end of the optical fibers 22, may be located at a position receding from, or inward of, the end face 24a of the metal plating layer 24.

Thus, in the optical fiber array 20 shown in FIG. 15, the lenses 22a recede from the end face 24a of the metal plating layer 24. Accordingly, when optically connected to an LD array, the lenses 22a never touch the corresponding light-emitting surfaces of the LD array, and damage to the LD array during the optical connection can be reliably prevented.

This optical fiber array 20 can be produced by carrying out the first to third steps described above, and then suitably controlling the etching amount during the formation of the lenses 22a (fourth step).

What is claimed is:

1. An optical fiber array comprising:

a plurality of silica glass optical fibers; and a single piece fiber array member made of a synthetic resin in which said plurality of silica glass optical fibers are arranged and fixed, without the use of a guide member;

each of said plurality of silica glass optical fibers having an end projecting from an end face of said fiber array member by a substantially equal length, and a lens having a shape of one of (i) a cone and (ii) a truncated cone formed at the end thereof, and each of said plurality of silica glass optical fibers comprises a core and a cladding; and the core and the cladding being formed of materials which, when immersed in one of a hydrofluoric acid and a solution of a mixture of hydrofluoric acid and ammonium fluoride, are etched such that the cladding is etched faster than the core.

2. The optical fiber array according to claim 1, wherein said fiber array member is made of a synthetic resin and has a plurality of fiber holes formed therethrough at an equal pitch, said plurality of optical fibers being respectively inserted into said fiber holes.

3. The optical fiber array according to claim 1, further comprising shield layer means, formed on an outer periphery of said fiber array member and on outer peripheries of said plurality of optical fibers, for shielding the fiber array against gas exhausted from the synthetic resin forming the fiber array due to heat generated by a laser diode array.

4. The optical fiber array according to claim 3, wherein said shield layer means comprises a metal plating layer.

5. The optical fiber array according to claim 1, wherein:

the core of each of said silica glass optical fibers is made of pure silica glass; and the cladding of each of said silica glass optical fibers is made of silica glass doped with a fluorine-based substance.

6. The optical fiber array according to claim 1, wherein:

the core of each of said silica glass optical fibers is made of silica glass doped with germanium dioxide; and the cladding of each of said silica glass optical fibers is made of one of a pure silica glass and silica glass doped with a fluorine-based substance.

7. An optical fiber array comprising:

a plurality of silica glass optical fibers; and a single piece fiber array member which is made of a synthetic resin, and in which said plurality of silica glass optical fibers are arranged and fixed, without the use of a guide member;

each of said plurality of silica glass optical fibers having an end projecting from a distal end face of said fiber array member by a substantially equal length, and a lens formed at the end of each optical fiber, and shield layer means, formed on an outer periphery of said fiber array member and on outer peripheries of said plurality of optical fibers excluding the distal end face of each optical fiber, for shielding the fiber array against gas exhausted from the synthetic resin forming the fiber array due to heat generated by a laser diode array.

8. The optical fiber array according to claim 7, wherein said lens has a shape of one of (i) a cone and (ii) a truncated cone.

9. The optical fiber array according to claim 7, wherein said shield layer is formed as a metal plating.

10. A method of producing an optical fiber array, comprising the steps of:

arranging and fixing a plurality of optical fibers in a fiber array member such that an end of each of the optical fibers is projected from an end face of the fiber array member;

forming a coating layer of a desired thickness over the end face of the fiber array member and portions of the optical fibers projecting from the end face of the fiber array member;

collectively polishing the ends of the optical fibers projecting from the end face of the fiber array member, together with the coating layer, up to a predetermined position, thereby making the lengths of projections of the optical fibers substantially equal; and removing the coating layer and forming a lens at the polished end of each of the optical fibers.

11. The method according to claim 10, further comprising a step of forming a shield layer over an entire surface of the fiber array member and over entire surfaces of the portions of the optical fibers projecting from the fiber array member before said coating-layer formation step is carried out.

12. The method according to claim 11, wherein said shield layer comprises a metal plating layer.

13. The method according to claim 11, wherein said lens formation step includes an etching step in which the ends of the optical fibers are immersed in one of a hydrofluoric acid and a solution of a mixture of hydrofluoric acid and ammonium fluoride so that a cladding of each optical fiber is etched faster than a core thereof.

14. The method according to claim 10, wherein said lens formation step includes an etching step in which the ends of the optical fibers are immersed in one of a hydrofluoric acid and a solution of a mixture of hydrofluoric acid and ammonium fluoride so that a cladding of each optical fiber is etched faster than a core thereof.

* * * * *